(12) United States Patent
Gong et al.

(10) Patent No.: US 11,347,406 B2
(45) Date of Patent: May 31, 2022

(54) METHOD, ELECTRONIC DEVICE AND COMPUTER PROGRAM PRODUCT FOR UPDATING INFORMATION

(71) Applicant: EMC IP Holding Company LLC, Hopkinton, MA (US)

(72) Inventors: Shaoqin Gong, Beijing (CN); Geng Han, Beijing (CN); Jian Gao, Beijing (CN); Xinlei Xu, Beijing (CN); Changrui Shao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 85 days.

(21) Appl. No.: 17/021,256

(22) Filed: Sep. 15, 2020

(65) Prior Publication Data
US 2021/0286527 A1 Sep. 16, 2021

(30) Foreign Application Priority Data
Mar. 11, 2020 (CN) .......................... 202010167956.6

(51) Int. Cl.
*G06F 12/00* (2006.01)
*G06F 3/06* (2006.01)

(52) U.S. Cl.
CPC ............ *G06F 3/0619* (2013.01); *G06F 3/065* (2013.01); *G06F 3/067* (2013.01)

(58) Field of Classification Search
CPC ......... G06F 3/0619; G06F 3/065; G06F 3/067
See application file for complete search history.

(56) References Cited

U.S. PATENT DOCUMENTS

| 2009/0030986 | A1* | 1/2009 | Bates | ..................... G06F 3/065 709/205 |
| 2021/0089219 | A1* | 3/2021 | Pahwa | ................ G06F 12/0646 |

\* cited by examiner

*Primary Examiner* — Daniel D Tsui
(74) *Attorney, Agent, or Firm* — BainwoodHuang

(57) ABSTRACT

Techniques for information update involve: updating, at a first node, first information in a first memory and second information associated with the first information, wherein the first information needs to be persistently stored, and the second information can be obtained from the first information and does not need to be stored persistently; storing the updated first information and the updated second information into a first region and a second region of a first persistent storage device, respectively; synchronizing the updated first information and the updated second information to a second node; and validating the updated first information stored in the first region and invalidating the updated second information stored in the second region based on a determination that the synchronization is successful. Such techniques can achieve incremental update of non-persistent information, thereby improving system performance.

15 Claims, 5 Drawing Sheets

METHOD, ELECTRONIC DEVICE AND COMPUTER PROGRAM PRODUCT FOR UPDATING INFORMATION

CROSS-REFERENCE TO RELATED APPLICATION

This application claims priority to Chinese Patent Application No. CN202010167956.6, on file at the China National Intellectual Property Administration (CNIPA), having a filing date of Mar. 11, 2020, and having "METHOD, ELECTRONIC DEVICE AND COMPUTER PROGRAM PRODUCT FOR UPDATING INFORMATION" as a title, the contents and teachings of which are herein incorporated by reference in their entirety.

TECHNICAL FIELD

Embodiments of the present disclosure generally relate to the field of data storage, and more particularly, to a method, an electronic device, and a computer program product for information update.

BACKGROUND

In a storage system, some information is usually stored in a persistent storage device and is loaded into a memory for use. This information is also called "persistent information." In addition, there is some information that may be generated according to persistent information, and therefore, is usually not stored persistently. This information is also called "non-persistent information." The storage system often uses multiple storage nodes to store multiple copies of the same information to avoid data loss. When persistent information at one storage node is updated, non-persistent information at the storage node may need to be regenerated according to the update of the persistent information. In addition, the storage node needs to synchronize the updated persistent information to other storage nodes. In this way, non-persistent information at the other storage nodes also needs to be regenerated accordingly.

SUMMARY OF THE INVENTION

Embodiments of the present disclosure provide a method, an electronic device, and a computer program product for information update.

In a first aspect of the present disclosure, a method for information update is provided. The method includes: updating, at a first node, first information in a first memory and second information associated with the first information, wherein the first information needs to be persistently stored, and the second information can be obtained from the first information and does not need to be stored persistently; storing the updated first information and the updated second information into a first region and a second region of a first persistent storage device, respectively; synchronizing the updated first information and the updated second information to a second node, such that the second node stores the updated first information into a second memory at the second node and a second persistent storage device, and stores the updated second information into the second memory; and validating the updated first information stored in the first region and invalidating the updated second information stored in the second region based on a determination that the synchronization is successful.

In a second aspect of the present disclosure, an electronic device is provided. The device includes a processor and a memory. The memory is coupled to the processor and stores instructions for execution by the processor. The instructions, when executed by the processor, cause the device to perform actions. The actions include: updating first information in the memory and second information associated with the first information, wherein the first information needs to be persistently stored, and the second information can be obtained from the first information and does not need to be stored persistently; storing the updated first information and the updated second information into a first region and a second region of a persistent storage device, respectively; synchronizing the updated first information and the updated second information to another electronic device, such that the another electronic device stores the updated first information into another memory at the another electronic device and another persistent storage device, and stores the updated second information into the another memory; and validating the updated first information stored in the first region and invalidating the updated second information stored in the second region based on a determination that the synchronization is successful.

In a third aspect of the present disclosure, a computer program product is provided. The computer program product is tangibly stored in a non-transitory computer storage medium and includes machine-executable instructions. When executed by a device, the machine-executable instructions cause the device to perform the method described according to the above first aspect.

In a fourth aspect of the present disclosure, there is provided a computer-readable storage medium on which a computer program is stored. When executed by a processor, the program implements the method described according to the above first aspect.

This summary is provided to introduce the selection of concepts in a simplified form, which will be further described in the detailed description below. This summary is neither intended to identify key features or essential features of the present disclosure, nor intended to limit the scope of the present disclosure.

DESCRIPTION OF THE DRAWINGS

The above and other objectives, features and advantages of the present disclosure will become more apparent by describing example embodiments of the present disclosure in more detail with reference to the accompanying drawings, and in the example embodiments of the present disclosure, the same reference numerals generally represent the same components.

In each figure, identical or corresponding reference numerals represent identical or corresponding parts.

DETAILED DESCRIPTION

Figure 1:
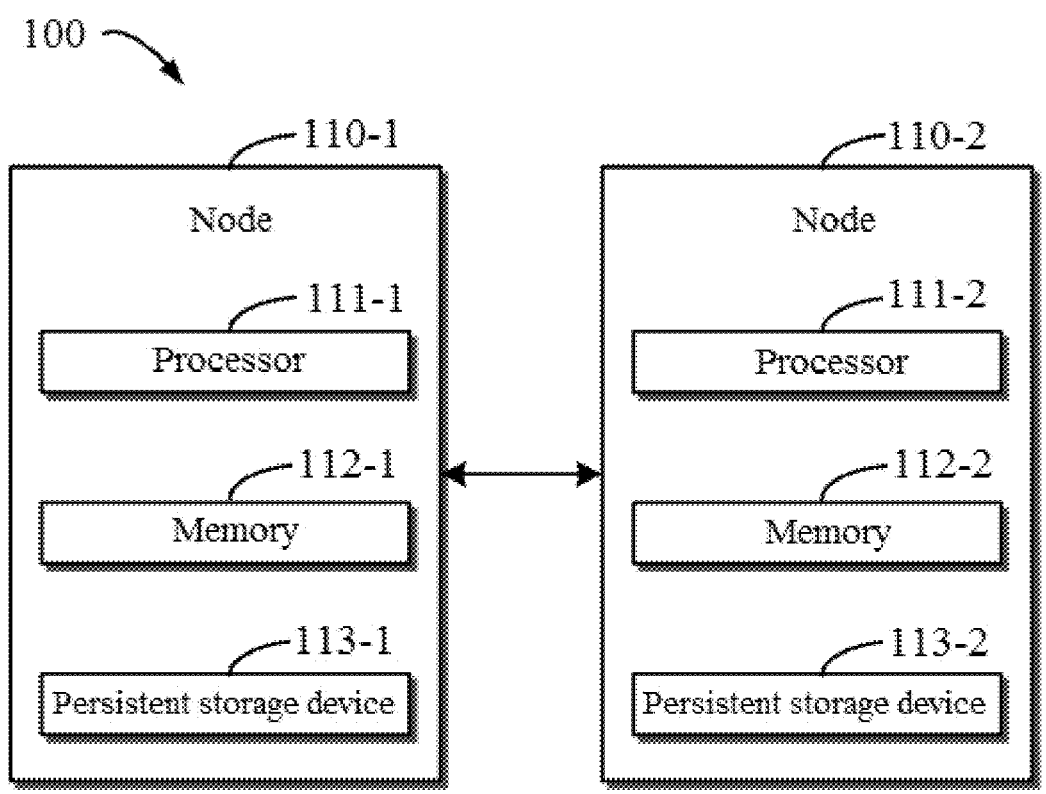
FIG. 1 illustrates a block diagram of an example environment in which embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the accompanying drawings. Although preferred embodiments of the present disclosure are illustrated in the accompanying drawings, it should be understood that the present disclosure may be implemented in various forms and should not be limited by the embodiments illustrated herein. Rather, these embodiments are provided to make the present disclosure more thorough and complete, and will fully convey the scope of the present disclosure to those skilled in the art.

The term "include" and variants thereof as used herein are intended to be open-ended, i.e., "including but not limited to." Unless specifically stated, the term "or" means "and/or." The term "based on" means "based at least in part on." The terms "one example embodiment" and "one embodiment" mean "at least one example embodiment." The term "another embodiment" means "at least one additional embodiment." The terms "first," "second," etc. may refer to different or identical objects. Other explicit and implicit definitions may be included below.

As described above, in a storage system, persistent information may be stored in a persistent storage device and loaded into a memory for use. Non-persistent information may be generated according to the persistent information, and therefore, is usually not stored in the persistent storage device. The storage system often uses multiple storage nodes to store multiple copies of the same information to avoid data loss. When persistent information at one storage node is updated, non-persistent information at the storage node may need to be regenerated according to the updated persistent information. In addition, the storage node needs to synchronize the updated persistent information to other storage nodes. In this way, non-persistent information at the other storage nodes also needs to be regenerated accordingly. Such repeated generation of the non-persistent information will affect the performance of the storage system.

The embodiments of the present disclosure provide a scheme for information update to solve the above problems and/or other potential problems. According to this scheme, at a primary storage node, persistent information and associated non-persistent information stored in a memory are updated. Then, the updated persistent information and non-persistent information are stored into a first region and a second region of a persistent storage device at the primary storage node, respectively. In addition, the updated persistent information and non-persistent information are synchronized to a secondary storage node. The secondary storage node may store the updated persistent information in a memory thereof and a corresponding persistent storage device, and store the updated non-persistent information only in the memory thereof. When the information synchronization is successful, the updated non-persistent information stored in the second region at the primary storage node is invalidated. In this way, the embodiments of the present disclosure can achieve incremental update of non-persistent information. Meanwhile, storage nodes other than the primary storage node do not need to repeatedly regenerate non-persistent information, thereby improving system performance.

The embodiments of the present disclosure will be described in detail below with reference to the accompanying drawings. FIG. 1 illustrates a block diagram of example environment 100 in which the embodiments of the present disclosure can be implemented. It should be understood that the structure of example environment 100 is described for illustrative purposes only. The type and quantity of entities included in example environment 100 are also shown for illustrative purposes only, without implying any limitation to the scope of the present disclosure. The embodiments of the present disclosure may be implemented in an environment different from environment 100.

As shown in FIG. 1, environment 100 may include storage nodes 110-1 and 110-2. Storage node 110-1 is taken as an example, which may include processor 111-1, memory 112-1, and persistent storage device 113-1. Storage node 110-2 is taken as an example, which may include processor 111-2, memory 112-2, and persistent storage device 113-2. Hereinafter, storage nodes 110-1 and 110-2 may be collectively referred to as "storage node 110" or "node 110." Memories 112-1 and 112-2 may be collectively referred to as "memory 112." Persistent storage devices 113-1 and 113-2 may be collectively referred to as "persistent storage device 113."

Storage nodes 110-1 and 110-2 may be communicatively coupled to each other and used to store multiple copies of the same information to avoid data loss. For example, information stored at storage node 110-1 may be synchronously stored at storage node 110-2. Hereinafter, for illustrative purposes only, storage node 110-1 is also referred to as "primary storage node" or "primary node," which is configured to update stored information and synchronize the updated information to storage node 110-2. Storage node 110-2 is therefore also referred to as "secondary storage node" or "secondary node." It should be understood that storage node 110-1 or 110-2 may be implemented using any physical host, virtual machine, or other devices. In addition, storage node 110-1 or 110-2 may be implemented using one or more physical devices.

The information stored at each storage node 110 may include persistent information and non-persistent information. The persistent information refers to information to be stored in persistent storage device 113. The persistent information may be, for example, loaded into corresponding memory 112 when storage node 110 is started. The non-persistent information may be generated based on the persistent information, and therefore generally does not need to be stored in persistent storage device 113. Persistent storage device 113 may be implemented using any non-volatile storage medium that is known or to be developed, including, but not limited to, a magnetic disk, an optical disk, a solid state disk, and the like. In some embodiments, persistent storage device 113 may include multiple disks that may be organized into a disk array for management.

Figure 2:
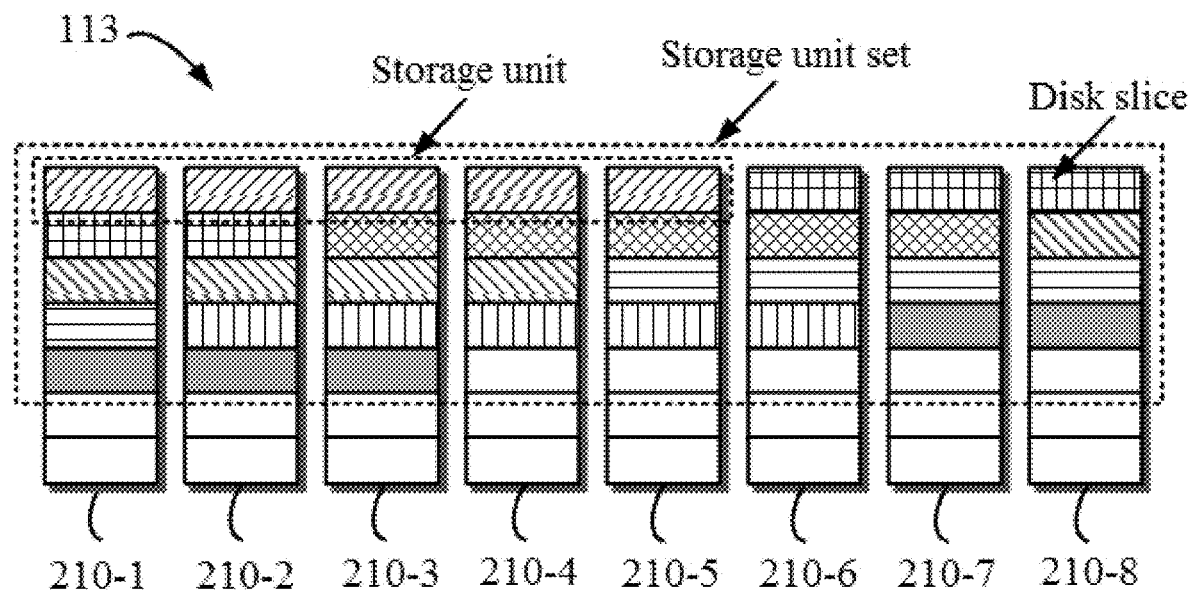
FIG. 2 illustrates a schematic diagram of an example persistent storage device according to an embodiment of the present disclosure.

FIG. 2 illustrates a schematic diagram of example persistent storage device 113 according to an embodiment of the present disclosure. As shown in FIG. 2, persistent storage device 113 (for example, persistent storage device 113-1 or 113-2) may include disks 210-1, 210-2, . . . , 210-8 (collectively referred to as "disk 210"). It should be understood that the number of disks 210 shown in FIG. 2 is shown for illustrative purposes only, and does not imply any limitation to the scope of the present disclosure.

As shown in FIG. 2, each disk 210 may be divided into multiple disk slices (for example, each disk slice has the same size). Multiple disk slices distributed on one or more disks 210 may be organized into storage units for providing, for example, the function of a redundant array of independent disks (RAID). In the example of FIG. 2, disk slices with the same fill pattern belong to the same storage unit, while disk slices with different fill patterns belong to different storage units, and unfilled disk slices have not been used.

In some embodiments, the multiple storage units may be further classified into a storage unit set. Persistent storage device 113 may include, for example, multiple storage unit sets for different purposes or different data types. The multiple storage unit sets may include, for example, a storage unit set for storing user data, a storage unit set for storing metadata (referring to data describing attributes of the user data), a storage unit set for storing log data, a storage unit set for storing log metadata (referring to data describing attributes of the log data), a storage unit set for storing metadata and structural information of each storage unit set, and the like.

Figure 3:
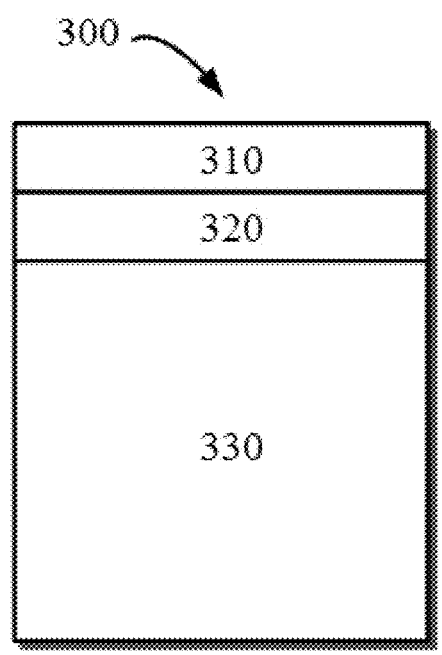
FIG. 3 illustrates a schematic diagram of an example layout of a storage unit set according to an embodiment of the present disclosure.

FIG. 3 illustrates a schematic diagram of an example layout of storage unit set 300 according to an embodiment of the present disclosure. Storage unit set 300 may be implemented at persistent storage device 113 as shown in FIG. 1. As shown in FIG. 3, storage unit set 300 may be, for example, divided into three partitions 310, 320, and 330. Partition 310 is also referred to as "super partition," which is used to store address information (for example, a start address) of partition 320 and address information of a valid region (for example, start and end addresses of the valid region) in partition 330. Partition 330 is also referred to as "data partition," which is used to store data, and valid data therein is indicated by address information of a valid region in partition 310. For example, data in the range of a valid region (for example, start and end addresses of the valid region) indicated by partition 310 is valid data. Partition 320 is also referred to as "temporary storage partition," which is used to temporarily store modifications to the data partition. When the modifications temporarily stored in partition 320 reach a predetermined amount, these modifications may be copied into data partition 330 to avoid frequent writing to data partition 330. In some embodiments, the update to data may be written to data partition 330 in an append-only manner instead of overwriting old data, thereby improving the efficiency of data writing.

As previously described, the information stored at each storage node 110 may include persistent information and non-persistent information. In some embodiments, the persistent information may be stored in, for example, storage unit set 300 as shown in FIG. 3 and loaded into corresponding memory 112 when storage node 110 is started. The non-persistent information may be generated based on the persistent information and does not need to be stored in storage unit set 300. When storage unit set 300 is configured to store metadata and structural information of other storage unit sets, the persistent information may include, for example, the metadata and structural information of other storage unit sets. For example, based on the persistent information, for a given storage unit in other storage unit sets, corresponding disk identifiers and disk slice identifiers of all disk slices corresponding to the given storage unit may be determined. In some cases, it may also be desirable to determine, for a given disk slice, a storage unit and a storage unit set to which the given disk slice belongs. This information (that is, "non-persistent information") may be generated based on the persistent information described above, and therefore, only needs to exist in memory 112 and does not need to be stored in persistent storage device 113 (for example, storage unit set 300).

When the metadata and structural information of other storage unit sets are changed, the persistent information stored in storage unit set 300 needs to be updated. For example, when persistent information stored at primary node 110-1 is updated, the non-persistent information associated with the persistent information needs to be updated accordingly. In addition, the updated information also needs to be synchronized to secondary node 110-2.

Figure 4:
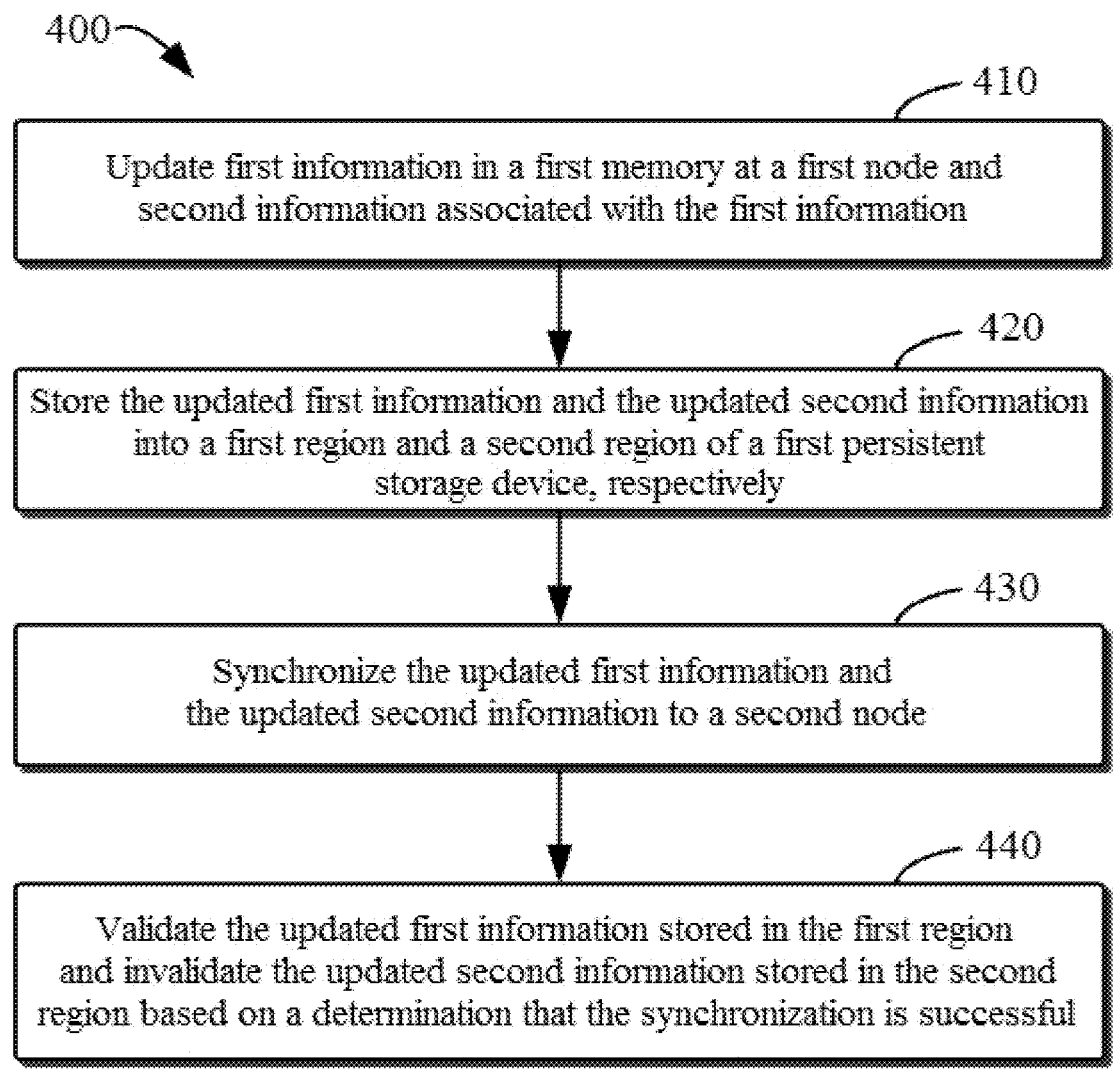
FIG. 4 illustrates a flowchart of an example method for information update according to an embodiment of the present disclosure.

FIG. 4 illustrates a flowchart of example method 400 for information update according to an embodiment of the present disclosure. For example, method 400 may be performed at primary node 110-1 as shown in FIG. 1. It should be understood that method 400 may further include additional blocks not shown and/or omit the blocks shown, and the scope of the present disclosure is not limited in this regard. Method 400 is described in detail below with reference to FIG. 1.

As shown in FIG. 4, at block 410, primary node 110-1 updates first information in memory 112-1 (also referred to as "first memory") and second information associated with the first information. The first information is information to be stored persistently, that is, the persistent information described above. The second information is information obtainable from the first information and does not need to be stored persistently, that is, the non-persistent information described above.

In some embodiments, the first information may be stored, for example, in persistent storage device 113-1 (also referred to as "first persistent storage device") at primary node 110-1, and loaded into memory 112-1 when primary node 110-1 is started.

In some embodiments, in order to update the first information and the second information, primary node 110-1 may create a transaction for information update. Primary node 110-1 may update the first information in memory 112-1, and add the update to the first information to the transaction. Primary node 110-1 may update, based on the updated first information, the second information associated therewith in memory 112-1, and add the update to the second information to the transaction. As will be further described below, when the transaction is submitted, modifications recorded in the transaction will be written to persistent storage device 113-1 and synchronized to secondary node 110-2.

At block 410, primary node 110-1 stores the updated first information and the updated second information into a first region and a second region of persistent storage device 113-1, respectively. In some embodiments, primary node 110-1 may store, by submitting the above transaction, the updated first information and the updated second information into persistent storage device 113-1, respectively.

Figure 5A:
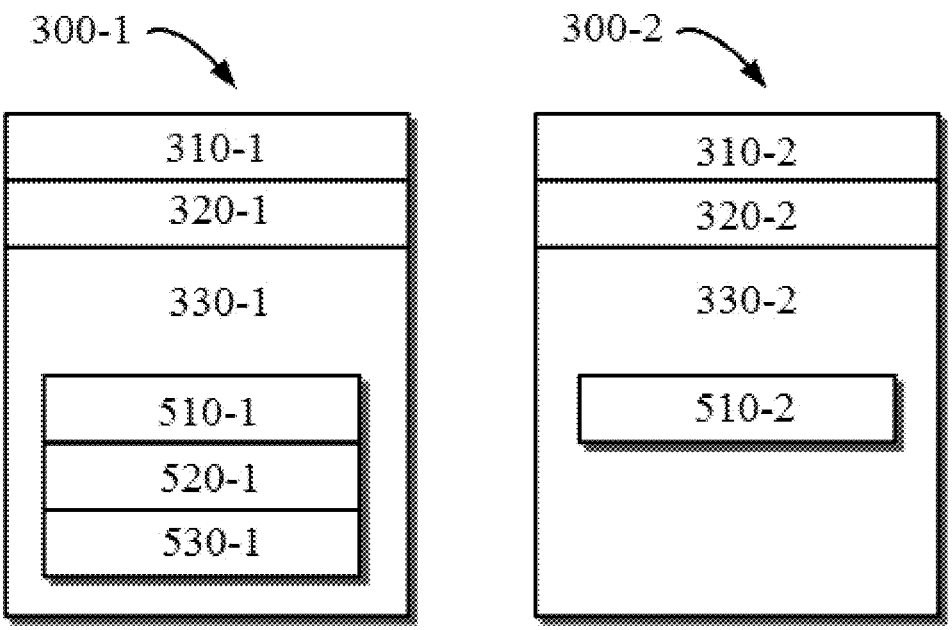
FIGS. 5A and 5B respectively illustrate schematic diagrams of an example layout of a storage unit set at the time of submitting and completing a transaction for information update according to an embodiment of the present disclosure.

FIG. 5A illustrates a schematic diagram of an example layout of a storage unit set at the time of submitting a transaction for information update according to an embodiment of the present disclosure. FIG. 5A illustrates storage unit set 300-1 implemented at persistent storage device 113-1 and storage unit set 300-2 implemented at persistent storage device 113-2. For example, like storage unit set 300 shown in FIG. 3, storage unit set 300-1 includes super partition 310-1, temporary storage partition 320-1, and data partition 330-1. Correspondingly, storage unit set 300-2 includes super partition 310-2, temporary storage partition 320-2, and data partition 330-2.

As shown in FIG. 5A, region 510-1 in data partition 330-1 and region 510-2 in data partition 330-2 store, for example, persistent information that has been synchronized between primary node 110-1 and secondary node 110-2, that is, unmodified persistent information. When primary node 110-1 submits a transaction for information update, the updated first information and the updated second information may be respectively written to region 520-1 (that is, "first region") and region 530-1 (that is, "second region") of data partition 330-1 in an append-only manner.

Referring back to FIG. 4, at block 430, primary node 110-1 synchronizes the updated first information and the updated second information to secondary node 110-2.

As described above, when primary node 110-1 submits a transaction for information update, the modifications recorded in the transaction, in addition to being written to corresponding regions in persistent storage device 113-1, will also be synchronized to secondary node 110-2. In some embodiments, primary node 110-1 may send a synchronization request to secondary node 110-2 such that secondary node 110-2 acquires the updated first information (that is, the updated persistent information) from first region 520-1 shown in FIG. 5A and acquires the updated second information (that is, the updated non-persistent information) from second region 530-1 shown in FIG. 5A.

In some embodiments, when secondary node 110-2 successfully acquires the updated first information and the updated second information, secondary node 110-2 may send a confirmation indicating that the synchronization is successful to primary node 110-1. Additionally, secondary node 110-2 may update the first information stored in memory 112-2 based on the updated first information, and update the second information stored in memory 112-2 based on the updated second information. In addition, secondary node 110-2 may also store the updated first information in persistent storage device 113-2, which will be further described in detail below with reference to FIG. 5B.

At block 440, primary node 110-1 validates the updated first information stored in the first region and invalidates the updated second information stored in the second region based on a determination that the synchronization is successful.

In some embodiments, when secondary node 110-2 successfully acquires the updated first information and the updated second information, secondary node 110-2 may send a confirmation indicating that the synchronization is successful to primary node 110-1. When primary node 110-1 receives the confirmation, primary node 110-1 may determine that the synchronization is successful. In this case, primary node 110-1 may update address information of a valid data region indicated in super partition 310-1 based on start and end addresses of first region 520-1 to indicate that first region 520-1 is a valid data region. Start and end addresses of second region 530-1 will not be updated to super partition 310-1, because the updated second information stored in second region 530-1 does not need to be stored persistently. In this way, in subsequent operations, the storage space occupied by second region 530-1 may be covered. The update of super partition 310-1 may identify the end of an information update operation at primary node 110-1.

In some embodiments, when primary node 110-1 does not receive a confirmation from secondary node 110-2 within a predetermined time, primary node 110-1 may determine that the synchronization fails. In this case, primary node 110-1 will not update super partition 310-1. In this way, in subsequent operations, the storage space occupied by first region 520-1 and second region 530-1 may be covered.

In some embodiments, when secondary node 110-2 successfully acquires the updated first information and the updated second information, secondary node 110-2 may update the first information stored in memory 112-2 based on the updated first information, and update the second information stored in memory 112-2 based on the updated second information. In addition, secondary node 110-2 may also store the updated first information into a corresponding region of data partition 330-2 in persistent storage device 113-2.

Figure 5B:
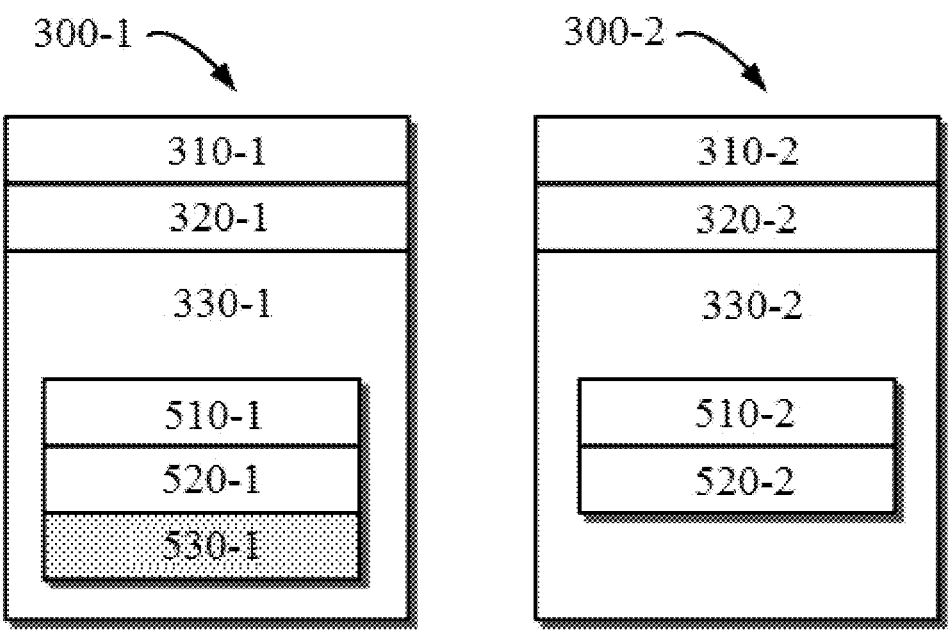

FIG. 5B illustrates a schematic diagram of an example layout of a storage unit set at the time of completing a transaction for information update according to an embodiment of the present disclosure. As shown in FIG. 5B, the updated first information is synchronized to region 520-2 in data partition 330-2, and region 520-2 corresponds to first region 520-1 in data partition 330-1. Meanwhile, region 530-1 in data partition 330-1 is invalidated. That is, in subsequent operations, the storage space occupied by second region 530-1 may be covered.

In this way, updates to both persistent information (for example, the first information) and non-persistent information (for example, the second information) may be synchronized to secondary node 110-2, and secondary node 110-2 does not need to regenerate non-persistent information based on the updated persistent information, thereby saving time and processor overheads. In addition, the storage space occupied by the updated non-persistent information at primary node 110-1 can be released for subsequent use. That is, the embodiments of the present disclosure can improve system performance without increasing storage space consumption.

Figure 6:
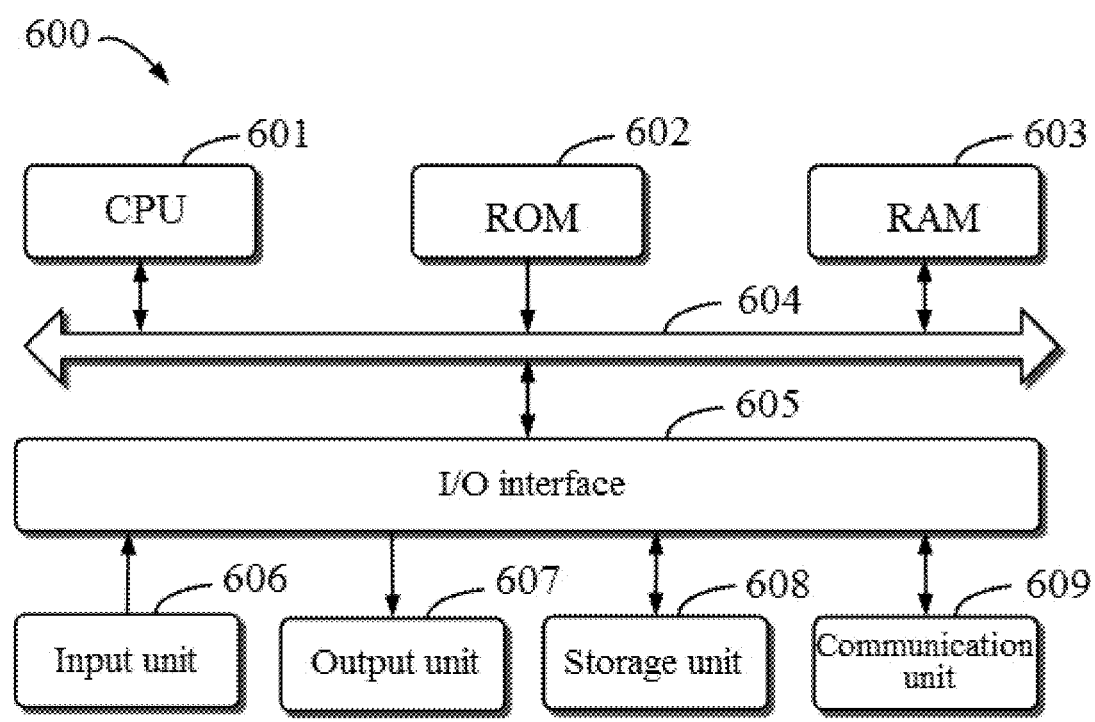
FIG. 6 illustrates a schematic block diagram of an example electronic device that may be used to implement embodiments of the present disclosure.

FIG. 6 illustrates a schematic block diagram of example electronic device 600 that may be used to implement embodiments of the present disclosure. For example, node 110-1 and/or 110-2 as shown in FIG. 1 may be implemented by device 600. As shown in FIG. 6, device 600 includes central processing unit (CPU) 601 that may perform various appropriate actions and processing according to computer program instructions stored in read only memory (ROM) 602 or computer program instructions loaded from storage unit 608 to random access memory (RAM) 603. In RAM 603, various programs and data required for the operation of device 600 may also be stored. CPU 601, ROM 602 and RAM 603 are connected to each other through bus 604. Input/output (I/O) interface 605 is also connected to bus 604.

Multiple components in device 600 are connected to I/O interface 605, including: input unit 606, such as a keyboard or a mouse; output unit 607, such as various types of displays or speakers; storage unit 608, such as a magnetic disk or an optical disk; and communication unit 609, such as a network card, a modem, or a wireless communication transceiver. Communication unit 609 allows device 600 to exchange information/data with other devices over a computer network such as the Internet and/or various telecommunication networks.

The various processes and processing described above, such as method 400, may be performed by processing unit 601. For example, in some embodiments, method 400 may be implemented as a computer software program that is tangibly included in a machine-readable medium, such as storage unit 608. In some embodiments, some or all of the computer program may be loaded and/or installed onto device 600 via ROM 602 and/or communication unit 609. One or more actions of method 400 described above may be performed when the computer program is loaded into RAM 603 and executed by CPU 601.

The present disclosure may be a method, a device, a system, and/or a computer program product. The computer program product may include a computer-readable storage medium having computer-readable program instructions for performing various aspects of the present disclosure loaded thereon.

The computer-readable storage medium may be a tangible device that may hold and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, an RAM, an ROM, an erasable programmable read only memory (EPROM or flash memory), a static random access memory (SRAM), a portable compact disk read only memory (CD-ROM), a digital versatile disk (DVD), a memory stick, a floppy disk, a mechanical coding device such as a punch card or a protruding structure within a groove having instructions stored thereon, and any suitable combination of the foregoing. The computer-readable storage medium as used herein is not to be interpreted as transient signals per se, such as radio waves or other freely propagated electromagnetic waves, electromagnetic waves propagated through waveguides or other transmission media (e.g., light pulses through fiber optic cables), or electrical signals transmitted through electrical wires.

The computer-readable program instructions described herein may be downloaded from the computer-readable storage medium to various computing/processing devices or downloaded to an external computer or an external storage device over a network, such as the Internet, a local area network (LAN), a wide area network (WAN), and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, status setting data, or source code or object code written in any combination of one or more programming languages, including object-oriented programming languages such as Smalltalk, C++, etc., as well as conventional procedural programming languages such as the "C" language or similar programming languages. The computer-readable program instructions may be completely executed on a user's computer, partially executed on a user's computer, executed as a separate software package, partially executed on a user's computer and partially executed on a remote computer, or completely executed on a remote computer or a server. In the case where a remote computer is involved, the remote computer may be connected to a user's computer through any type of networks, including an LAN or a WAN, or may be connected to an external computer (e.g., connected through the Internet by using an Internet service provider). In some embodiments, an electronic circuit, such as a programmable logic circuit, a field programmable gate array (FPGA), or a programmable logic array (PLA), may be customized by utilizing status information of computer-readable program instructions. The electronic circuit may execute the computer-readable program instructions to implement various aspects of the present disclosure.

Various aspects of the present disclosure are described herein with reference to flowcharts and/or block diagrams of the method, apparatus (system), and computer program product according to the embodiments of the present disclosure. It should be understood that each block in the flowcharts and/or the block diagrams and combinations of the blocks in the flowcharts and/or the block diagrams may be implemented by the computer-readable program instructions.

The computer-readable program instructions may be provided to a processing unit of a general purpose computer, a special purpose computer or other programmable data processing apparatuses, thereby producing a machine such that when these instructions are executed by the processing unit of the computer or other programmable data processing apparatuses, an apparatus for implementing functions/actions specified in one or more blocks in the flowcharts and/or the block diagrams is generated. The computer-readable program instructions may also be stored in the computer-readable storage medium. The instructions cause a computer, a programmable data processing apparatus and/or other devices to operate in a specific manner, so that the computer-readable medium storing the instructions includes an article of manufacture that includes instructions for implementing various aspects of functions/actions specified in one or more blocks in the flowcharts and/or the block diagrams.

The computer-readable program instructions may also be loaded onto a computer, other programmable data processing apparatuses or other devices such that a series of operational steps are performed on the computer, other programmable data processing apparatuses or other devices to produce a computer-implemented process. Thus, the instructions executed on the computer, other programmable data processing apparatuses or other devices implement the functions/actions specified in one or more blocks in the flowcharts and/or the block diagrams.

The flowcharts and block diagrams in the accompanying drawings illustrate the architectures, functions, and operations of possible implementations of systems, methods, and computer program products according to multiple embodiments of the present disclosure. In this regard, each block in the flowcharts or block diagrams can represent a module, a program segment, or a portion of instructions that includes one or more executable instructions for implementing specified logical functions. In some alternative implementations, functions indicated in the blocks may occur in an order different from that indicated in the accompanying drawings. For example, two successive blocks may actually be performed basically in parallel, or they may be performed in an opposite order sometimes, depending on the functions involved. It should also be noted that each block in the block diagrams and/or flowcharts and a combination of blocks in the block diagrams and/or flowcharts may be implemented using a dedicated hardware-based system for executing specified functions or actions, or may be implemented using a combination of dedicated hardware and computer instructions.

Various embodiments of the present disclosure have been described above, and the foregoing description is illustrative rather than exhaustive, and is not limited to the disclosed various embodiments. Multiple modifications and variations will be apparent to persons of ordinary skill in the art without departing from the scope and spirit of the illustrated various embodiments. The selection of terms as used herein is intended to best explain the principles and practical applications of the various embodiments, or the technical improvements to technologies on the market, or to enable other persons of ordinary skill in the art to understand the embodiments disclosed here.

The invention claimed is:

1. A method for information update, comprising:
updating, at a first node, first information in a first memory and second information associated with the first information, wherein the first information needs to be persistently stored, and the second information can be obtained from the first information and does not need to be stored persistently;
storing the updated first information and the updated second information into a first region and a second region of a first persistent storage device, respectively;
synchronizing the updated first information and the updated second information to a second node, such that the second node stores the updated first information into a second memory at the second node and a second persistent storage device, and stores the updated second information into the second memory; and
validating the updated first information stored in the first region and invalidating the updated second information stored in the second region based on a determination that the synchronization is successful.

2. The method according to claim 1, further comprising:
loading, before the update, the first information stored in the first persistent storage device into the first memory according to the start of the first node.

3. The method according to claim 1, wherein updating the first information and the second information comprises:
updating the first information in the first memory;
adding the update to the first information to a transaction for information update;
updating the second information in the first memory based on the updated first information; and
adding the update to the second information to the transaction.

4. The method according to claim 3, wherein storing the updated first information and the updated second information into the first region and the second region respectively comprises:
storing the updated first information and the updated second information into the first region and the second region respectively by submitting the transaction.

5. The method according to claim 1, wherein synchronizing the updated first information and the updated second information to the second node comprises:
sending a synchronization request to the second node, such that the second node acquires the updated first information from the first region and acquires the updated second information from the second region according to the synchronization request; and
determining that the synchronization is successful based on receiving, from the second node, a confirmation that the updated first information and the updated second information are acquired.

6. The method according to claim 5, further comprising:
determining that the synchronization fails based on not receiving the confirmation from the second node within a predetermined time.

7. The method according to claim 1, further comprising:
invalidating the updated first information stored in the first region and the updated second information stored in the second region based on a determination that the synchronization fails.

8. An electronic device, comprising:
a processor; and
a memory coupled to the processor and storing instructions for execution by the processor, wherein the instructions, when executed by the processor, cause the device to perform actions, the actions comprising:
updating first information in the memory and second information associated with the first information, wherein the first information needs to be persistently stored, and the second information can be obtained from the first information and does not need to be stored persistently;
storing the updated first information and the updated second information into a first region and a second region of a persistent storage device, respectively;
synchronizing the updated first information and the updated second information to another electronic device, such that the another electronic device stores the updated first information into another memory at the another electronic device and another persistent storage device, and stores the updated second information into the another memory; and
validating the updated first information stored in the first region and invalidating the updated second information stored in the second region based on a determination that the synchronization is successful.

9. The device according to claim 8, wherein the actions further comprise:
loading, before the update, the first information stored in the persistent storage device into the memory according to the start of the electronic device.

10. The device according to claim 8, wherein updating the first information and the second information comprises:
updating the first information in the memory;
adding the update to the first information to a transaction for information update;
updating the second information in the memory based on the updated first information; and
adding the update to the second information to the transaction.

11. The device according to claim 10, wherein storing the updated first information and the updated second information into the first region and the second region respectively comprises:

storing the updated first information and the updated second information into the first region and the second region respectively by submitting the transaction.

12. The device according to claim 8, wherein synchronizing the updated first information and the updated second information to the another electronic device comprises:
   sending a synchronization request to the another electronic device such that the another electronic device acquires the updated first information from the first region and acquires the updated second information from the second region according to the synchronization request; and
   determining that the synchronization is successful based on receiving, from the another electronic device, a confirmation that the updated first information and the updated second information are acquired.

13. The device according to claim 12, wherein the actions further comprise:
   determining that the synchronization fails based on not receiving the confirmation from the another electronic device within a predetermined time.

14. The device according to claim 8, wherein the actions further comprise:
   invalidating the updated first information stored in the first region and the updated second information stored in the second region based on a determination that the synchronization fails.

15. A computer program product having a non-transitory computer readable medium which stores a set of instructions to perform information update; the set of instructions, when carried out by computerized circuitry, causing the computerized circuitry to perform a method of:
   updating, at a first node, first information in a first memory and second information associated with the first information, wherein the first information needs to be persistently stored, and the second information can be obtained from the first information and does not need to be stored persistently;
   storing the updated first information and the updated second information into a first region and a second region of a first persistent storage device, respectively;
   synchronizing the updated first information and the updated second information to a second node, such that the second node stores the updated first information into a second memory at the second node and a second persistent storage device, and stores the updated second information into the second memory; and
   validating the updated first information stored in the first region and invalidating the updated second information stored in the second region based on a determination that the synchronization is successful.

* * * * *